April 1, 1941.   I. POMIERANIEC   2,237,196
GRIPPER OPERATING MECHANISM FOR TRANSPLANTING MACHINES
Filed July 24, 1939   2 Sheets-Sheet 1

Inventor
Israel Pomieraniec
By Clarence A. O'Brien
Hyman Berman
Attorneys

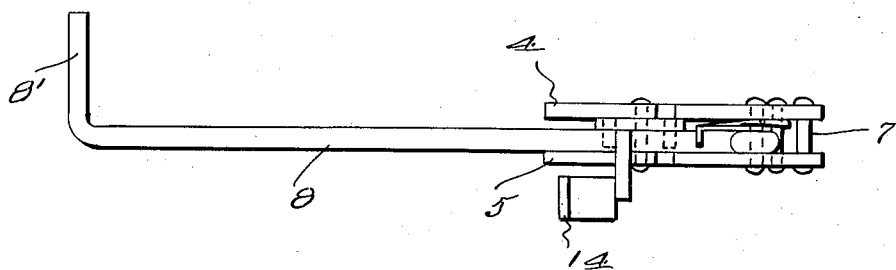
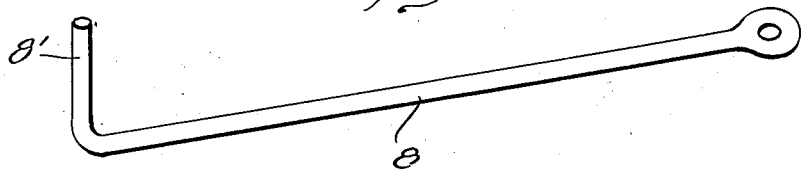
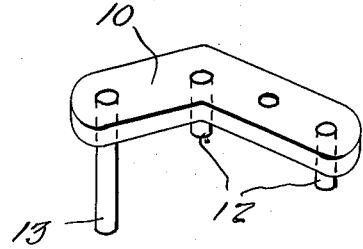
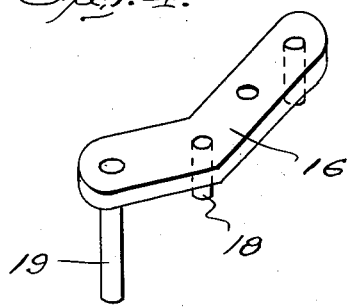
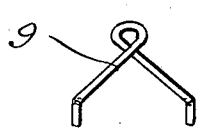

Patented Apr. 1, 1941

2,237,196

UNITED STATES PATENT OFFICE 2,237,196

GRIPPER OPERATING MECHANISM FOR TRANSPLANTING MACHINES

Israel Pomieraniec, London, England, assignor to Transplanters Holding Company Limited, London, England Application July 24, 1939, Serial No. 286,274
In Great Britain October 25, 1938

4 Claims. (Cl. 111—3)

The present invention relates to improvements in or relating to planting machines, commonly known as transplanting machines, and is particularly applicable to machines for planting such plants as cabbage, tobacco and the like.

In such machines it is a desideratum that they should be capable of planting a large number of plants per hour and at the same time that the devices which carry the plant to the soil do not move too quickly or in too rapid succession after the feeding position in order that the operator may have sufficient time to feed the plant to said devices.

It is an object of the present invention to provide a planting machine incorporating features which favor the attainment of the above mentioned desired mode of operation.

By way of example the invention is illustrated in the accompanying drawings forming part hereof, wherein like numerals refer to like parts throughout and in which:

Figure 2 is a side elevational view of one of the grippers.

Figure 3 is a perspective view of one of the grippers.

Figures 4 and 5 are perspective views of the alternately arranged operating levers for the grippers.

Figure 6 is a perspective view of the spring provided for maintaining the grippers in a closed position.

Figure 1:
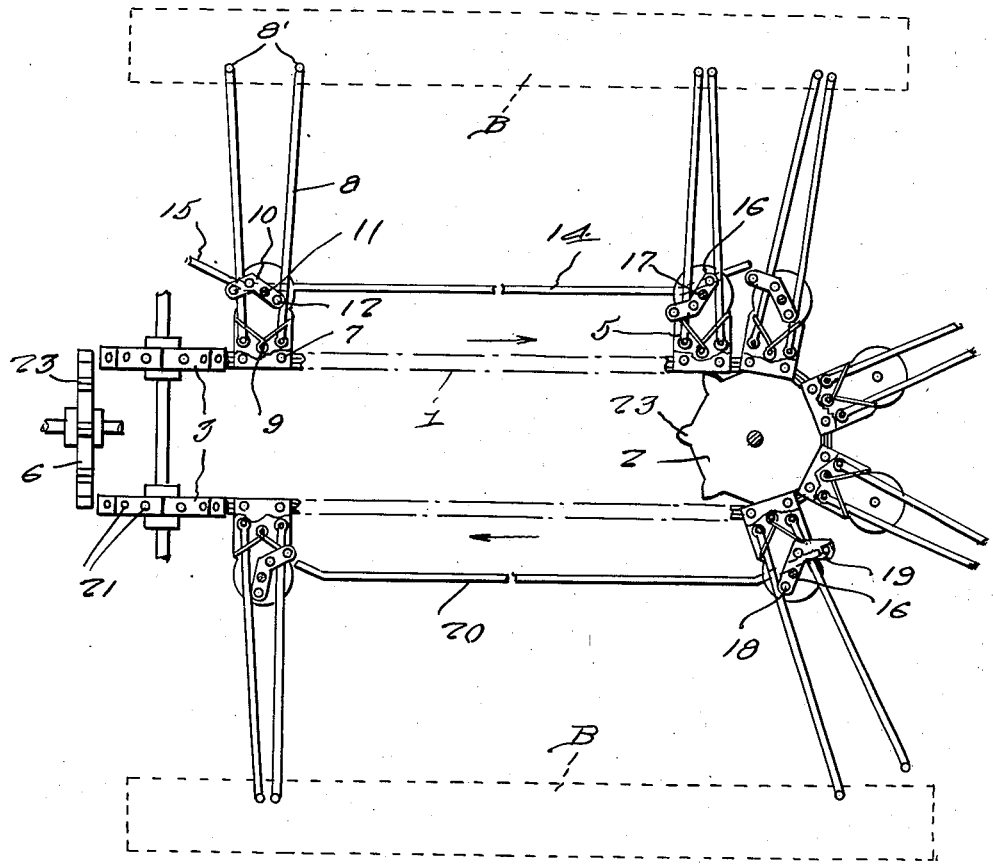
Figure 1 is a diagrammatic plan view of the endless chain carrying grippers with parts removed or broken away.

Referring now to the drawings in detail, an endless chain construction 1 is provided capable of flexing in two directions at right angles and arranged to run or travel about a sprocket or pulley 2 having a vertical axis and over spaced guide pulleys 3 on a common horizontal axis and under a drive sprocket or pulley 6 having its axis below the plane of the axis of the pulleys 3 and at right angles thereto, the chain traveling in a direction indicated by the arrows. Between the pulleys 2 and 3 the chain extends transversely to the direction of travel of the machine. The manner of articulation of the individual links of the chain is described in my copending application Ser. No. 286,275, filed July 24, 1939, and accordingly a detailed description of the hinge connection designated generally at H between the individual links is omitted from the specification of the present application. Each of the links are formed of a pair of upper and lower spaced plates 4 and 5 connected in spaced relation by rivets or the like 7. Each of the links are provided with a pair of gripping fingers 8, each having one end positioned between the plates 4 and 5 and pivoted thereto, the other ends of the fingers being formed with upstanding plant gripping pins 8', the upstanding pins of each pair of fingers cooperating to grip a plant therebetween. A spring 9 is provided for each pair of the gripping fingers 8 adapted to draw the fingers together into plant gripping position.

Each alternate link is provided with a gripper operating lever 10 supported on a pivot 11 between the plates 4 and 5 and is provided with a pair of depending pins 12 adapted to engage the respective fingers 8. The lever 10 projects at one side beyond the plate of the link and laterally and outwardly from the pivot 11 when the fingers are closed and is also provided with a depending pin 13 which projects downwardly beyond the plate 5 of the link.

A cam rail 14 is provided at one end with an angular lead-in portion 15 and extends transversely of the direction of travel of the machine and arranged for engagement by the pins 13 to rock the levers 10 in a counterclockwise direction to open the fingers 8 for the reception of plants between the gripping pins 8'. It will be understood that the plants will be placed on the upper surface of horizontal, transversely traveling bands or conveyors of conventional form, indicated by the dotted lines at B—B in Figure 1, one of said bands being mounted at each side of the plant grippers immediately beneath the pins 8' at the opposite flights of the chain and the plants are placed on these traveling bands with the leaves of the plant positioned between the pins 8' of the respective pairs of gripping fingers. As a pin 13 leaves the rail 14 shortly before reaching the pulley 2 the fingers 8 will close under the action of the spring 9 in a manner to cause the pins 8' to grip the plants therebetween.

The remaining links of the chain are provided with gripper operating levers 16 pivoted at 17 on the plate and carrying pins 18 for engaging the fingers 8 to open the fingers upon rotation of the lever 16 in a clockwise direction. The lever 16 likewise extends beyond one edge of the plate of the link and in a direction laterally and inwardly when the fingers are closed and the lever at its inner end is provided with a depending pin 19 adapted to engage a cam rail 20 arranged at the opposite flight of the chain from the rail 14, as shown in Fig. 1 of the drawings. As the lever 16 approaches the rail 20 the pin 19 will engage the same for swinging the lever in a clockwise direction whereby to open the fingers 8 for receiving the plant and as the pin 19 leaves the rear end of the rail the fingers will be closed by the action of the spring.

Figure 7:
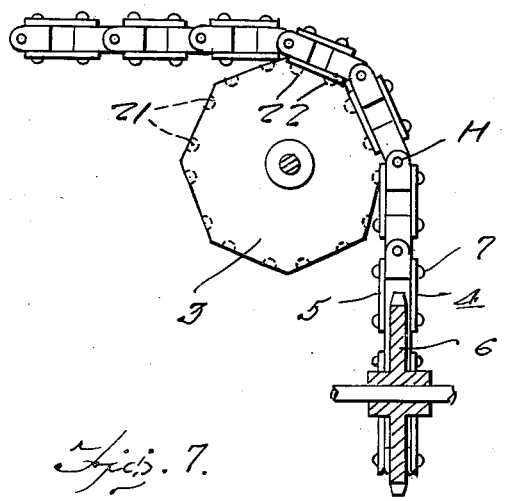
Figure 7 is a detail of one of the guide pulleys.
Figure 8:
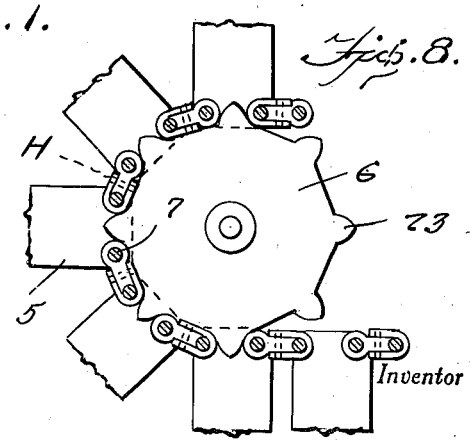
Figure 8 is a detail of one of the drive pulleys or sprockets.

The periphery of the pulleys 3 are provided with recesses 21 adapted to receive the protruding heads 22 of the rivets 7 to guide the links of the chain about the pulleys, as shown in Fig. 7, and the pulleys 2 and 6 have sprocket teeth 23 engaging between the hinged connectors H of the adjacent links as shown in Fig. 8 for actuating the chain.

In the operation of the device as the endless chain 1 travels over the pulleys 3 toward the pulley 2 the fingers 8 of the links provided with the type of lever indicated at 10 will be open and the plants can be fed to them by one or more operators who may be sitting on the machine adjacent that flight of the chain and just before the fingers reach the pulley 2 the same are closed thus picking up the plant. As the chain travels over the pulley 2 to the pulley 3 at the opposite flight of the chains the gripping fingers controlled by the levers 16 will then be open and the remaining fingers will remain closed. It will thus be apparent that plants can be fed to the fingers at the opposite flight of the chain without any interference between the operators.

It will be understood that any suitable means may be provided for opening the gripping fingers as they pass under the pulley 6 at which point the plants are hanging in a vertical position ready to be deposited into the ground.

Likewise the endless chain 1 may be driven by any suitable means, as for example, through an operative connection with the ground wheels of the machine on which the device is mounted. Also the necessary supporting frame, as well as the means for forming a furrow and for covering the roots of the plants are of conventional construction and accordingly not illustrated, since the same are not deemed necessary for a complete understanding of the invention.

It is believed the details of construction and manner of use of the device will be readily understood from the foregoing without further detailed explanation.

What is claimed is:

1. A planting machine having a plurality of gripping devices moveable in succession for receiving plants to be planted and carrying them to planting position through a plurality of plant feeding stations or zones arranged in succession along the path of travel of the said gripping devices, and means for opening certain of said gripping devices while the same travel through one of the zones while the remaining of the gripping devices remain closed.

2. A planting machine having a plurality of gripping devices moveable in succession for receiving plants to be planted and carrying them to planting position through a plurality of plant feeding stations or zones arranged in succession along the path of travel of the said gripping devices and means adjacent each of said zones for actuating certain of the gripping devices for moving the same to an open position while the remaining gripping devices remain closed and means for closing said first named gripping devices as the same leave the zone.

3. In a planting machine, a plurality of plant gripping devices moveable in succession for receiving plants to be planted and carrying them to planting position through a plurality of plant feeding stations or zones arranged in succession along the path of travel of the said gripping devices, each of said gripping devices including a pair of gripping fingers each pivoted at one end, spring means yieldably maintaining the other ends of the fingers in closed position for gripping a plant therebetween, a pivoted lever having pins engaging the respective fingers for moving the same into open position and an actuating member at each feeding station or zone paralleling the path of movement of the lever and engageable thereby for moving the fingers into an open position.

4. In a planting machine, a plurality of plant gripping devices movable in succession for receiving plants to be planted and carrying them to planting position through a plurality of plant feeding stations or zones arranged in succession along the path of travel of the said gripping devices, each of said gripping devices including a pair of gripping fingers each pivoted at one end, spring means yieldably maintaining the other ends of the fingers in closed position for gripping a plant therebetween, a pivoted lever having pins engaging the respective fingers for moving the same into open position and on actuating member at each feeding station or zone paralleling the path of movement of the lever and engageable thereby for moving the fingers into an open position, said actuating member comprising a rail with which the lever is in wiping contact, said rail having an angular end causing a tripping movement of the lever.

ISRAEL POMIERANIEC.